United States Patent

[11] 3,587,046

[72] Inventors Nobuyuki Tanaka
Yokohama-shi;
Naoki Morimoto, Tokyo, both of, Japan
[21] Appl. No. 749,843
[22] Filed Aug. 2, 1968
[45] Patented June 22, 1971
[73] Assignee Fujitsu Limited
Kawasaki, Japan
[32] Priority Aug. 8, 1967
[33] Japan
[31] 42-51146

[54] SLOPE DETECTING PATTERN RECOGNIZING SYSTEM FOR DETERMINING A LINE PATTERN
8 Claims, 69 Drawing Figs.

[52] U.S. Cl. .......... 340/146.3
[51] Int. Cl. .......... G06r 9/00
[50] Field of Search .......... 340/146.3; 235/61.115

[56] References Cited
UNITED STATES PATENTS 2,919,426 12/1959 Rohland .......... 340/146.3
3,242,463 3/1966 Baumberger .......... 340/146.3

*Primary Examiner*—Thomas A. Robinson
*Attorneys*—Curt M. Avery, Arthur E. Wilfond, Herbert L. Lerner and Daniel J. Tick

ABSTRACT: A line pattern is scanned in mutually perpendicular coplanar directions and the rising and decaying parts of the scanning signals produced are detected in each of the directions to provide rising and decaying signals. The rising and decaying signals are used to produce line detecting signals in accordance with the slopes of the lines of the line pattern. A field is detected in which the line pattern exists within the field of the scanning signals and a plurality of observing fields are set within the field. The line detecting signals classified by the slopes of lines within the observing fields are counted and various strokes are detected, and the line pattern is discriminated by the combination of the detected strokes.

FIG. 23a FIG. 23b
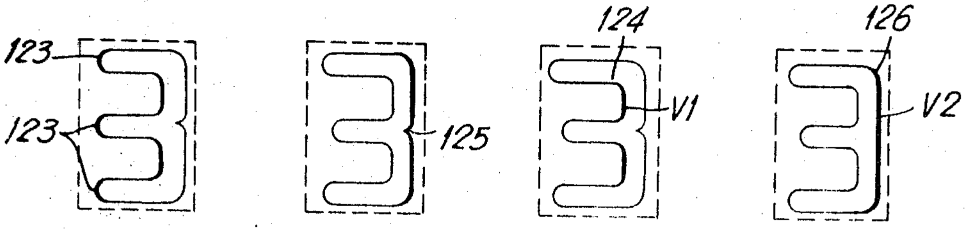
FIG. 23c FIG. 23d
FIG. 24a, FIG. 24b, FIG. 24c, FIG. 24d, FIG. 24e
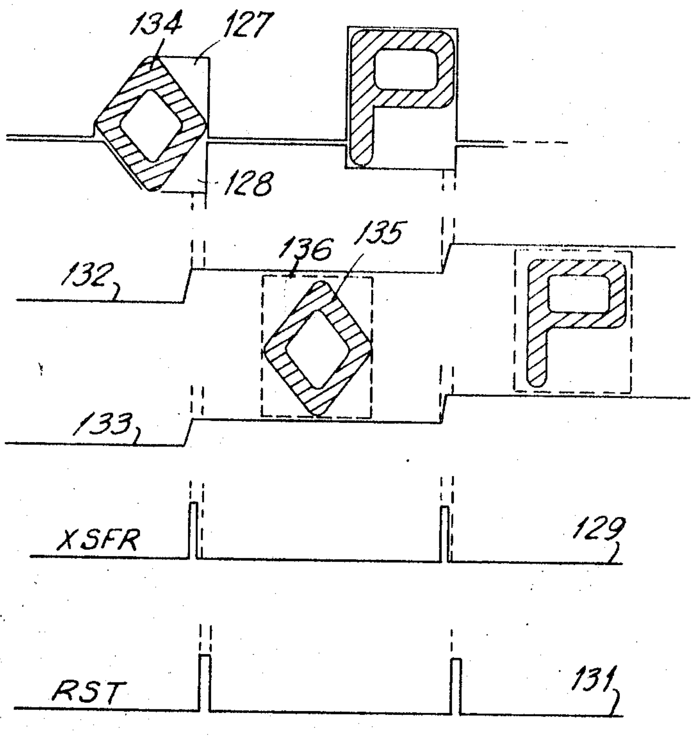

SLOPE DETECTING PATTERN RECOGNIZING SYSTEM FOR DETERMINING A LINE PATTERN

DESCRIPTION OF THE INVENTION

The present invention relates to a pattern recognizing system for determining a line pattern. More particularly, the invention relates to a slope detecting pattern recognizing system for determining a line pattern.

The principal object of the present invention is to provide a new and improved pattern recognizing system for determining a line pattern.

An object of the present invention is to provide a pattern recognizing system which functions with rapidity and facility.

An object of the present invention is to provide a pattern recognizing system which is efficient, effective and reliable in operation.

An object of the present invention is to provide a pattern recognizing system which determines a line pattern with accuracy.

In accordance with the present invention, a pattern recognizing system for determining a line pattern comprises a reading unit for scanning the line pattern in mutually perpendicular coplanar directions and for providing scanning signals in accordance with such scanning. A detector connected to the reading unit detects the rising and decaying parts of the scanning signals in each of the directions and provides rising and decaying signals in accordance with such detecting. A slope discriminator connected to the detector classifies the rising and decaying signals into line detecting signals in accordance with the slopes of the lines of the line pattern. A scanning field position detector connected to the reading unit detects a field in which the line pattern exists within the field of the scanning signals and sets a plurality of observing fields within the field. A stroke detector is connected to the slope discriminator and to the scanning field position detector and counts the line detecting signals classified by the slopes of lines within the observing fields and detects various strokes. A character discriminator connected to the stroke detector discriminates the line pattern by the combination of the detected strokes.

The rising part of a scanning signal is detected as the point of change from a blank part to a printed part of the line pattern relative to each of the directions and the decaying part of a scanning signal is detected as the point of change from a printed part to a blank part. A delay device is interposed between the detector and the slope discriminator. The detector comprises a detector for detecting the rising and decaying parts of the scanning signals in one of the directions and a detector for detecting the rising and decaying parts of the scanning signals in the other of the directions. The scanning field position detector comprises a field divider for forming a quadrilateral field. The directions of scanning of the line pattern are horizontal and vertical. The reading unit comprises a plurality of photoresponsive elements and amplifiers connected to the outputs thereof.

In order that the present invention may be readily carried into effect, it will now be described with reference to the accompanying drawings, wherein:

FIGS. 1, 2*a* and 2*b* are diagrams illustrating the principle of operation of a known stroke system for determining a line pattern;

FIGS. 3*a*, 3*b*, 3*c*, 4*a*, 4*b*, 4*c*, 4*d* and 4*e* are diagrams illustrating the principle of operation of the stroke system of the present invention for determining a line pattern;

Figure 5:
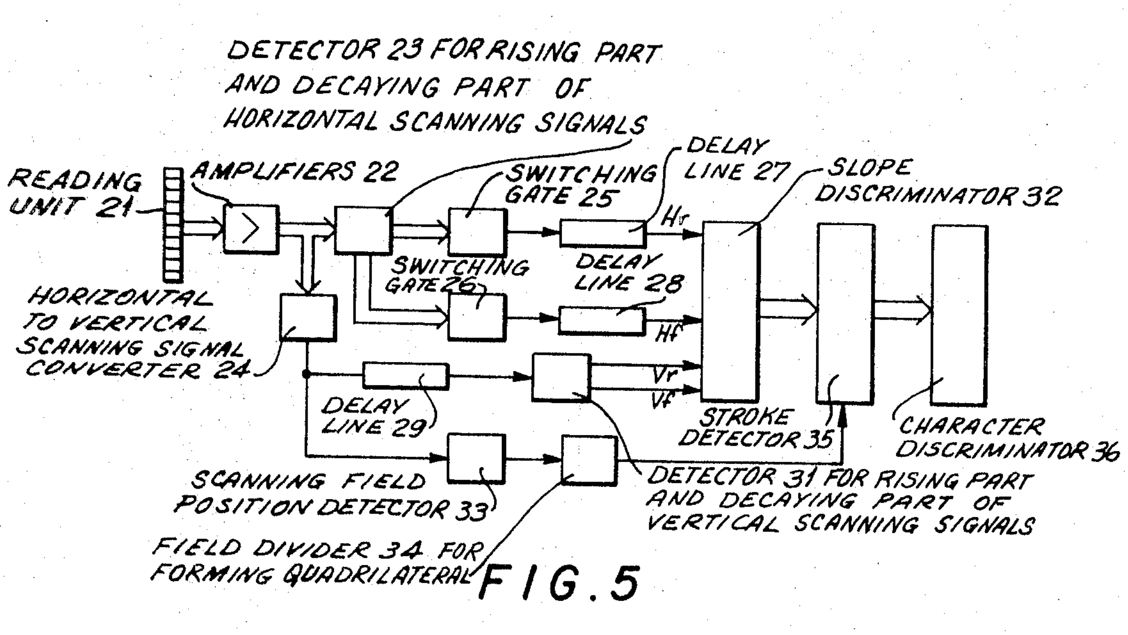
FIG. 5 is a block diagram of an embodiment of the pattern recognizing system of the present invention.
Figures 8A, 8B, 8C:
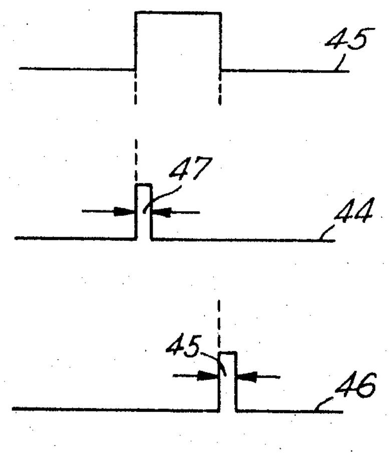
Figure 9:
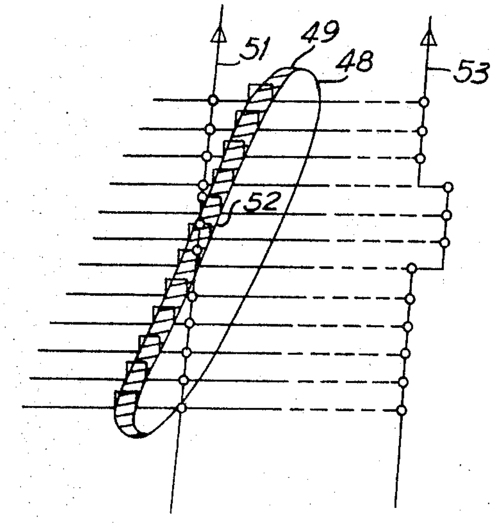
Figure 10:
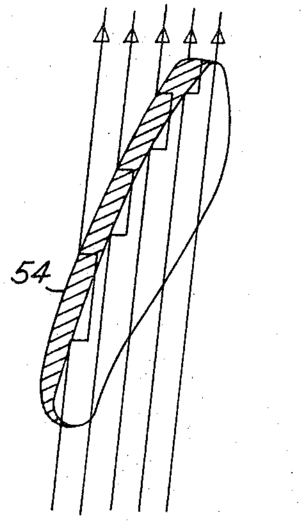
Figure 11:
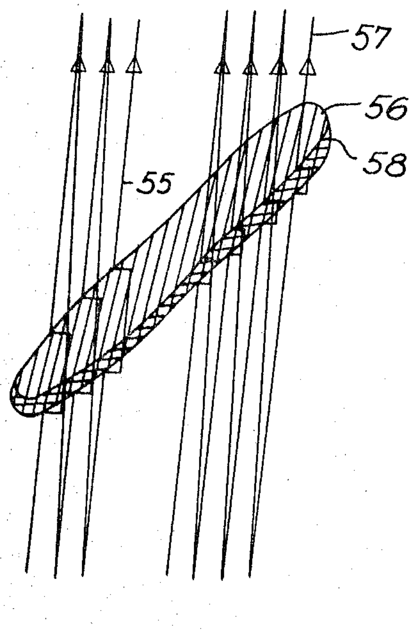
Figure 12:
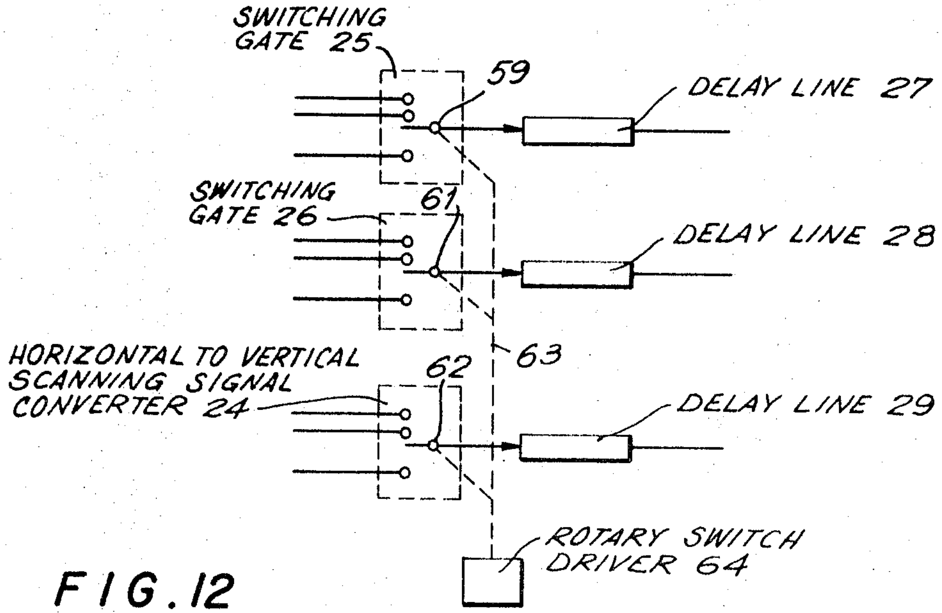
Figure 13:
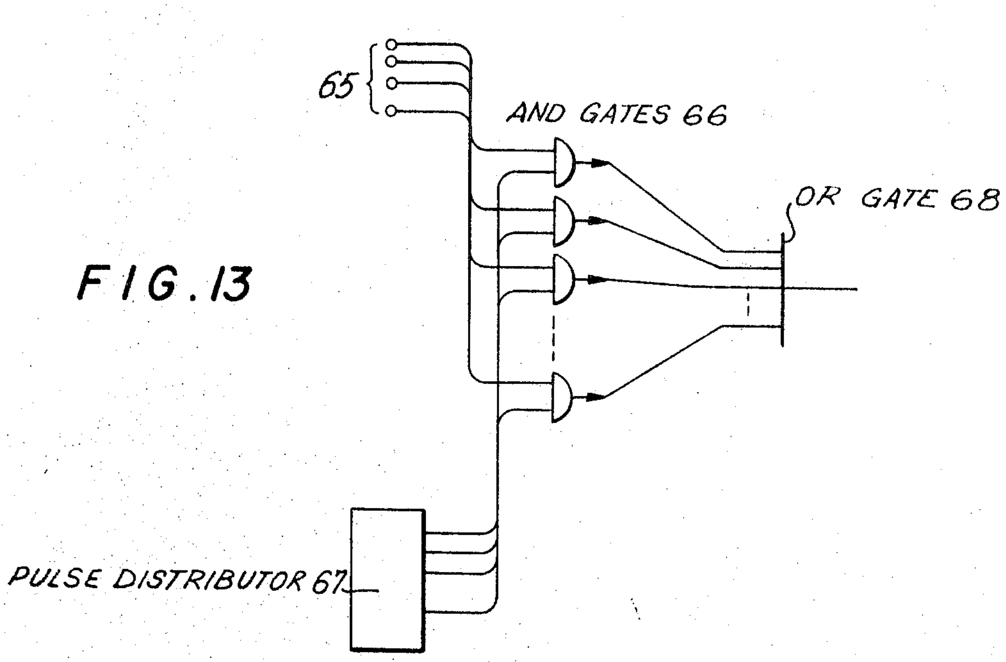
Figure 15:
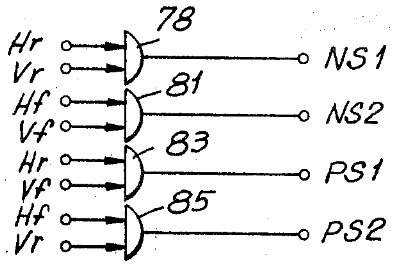
Figure 18:
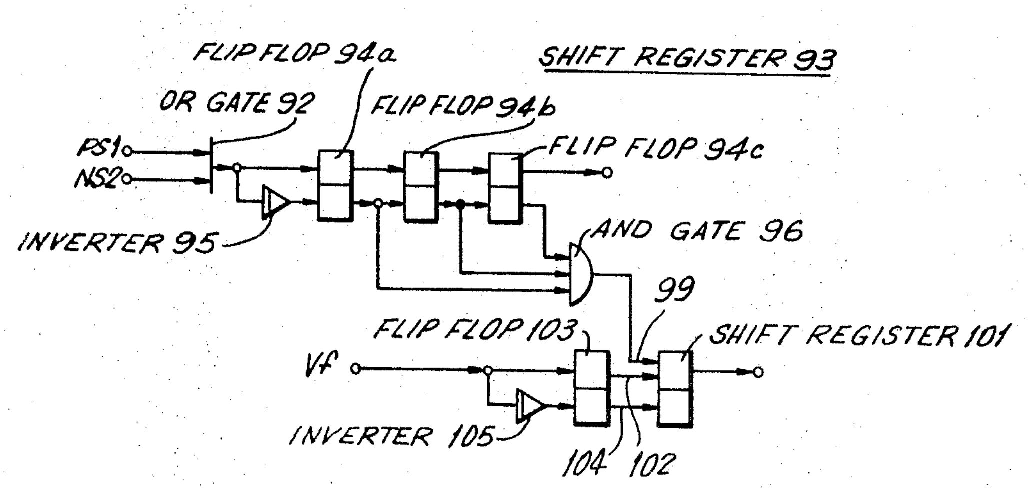
Figure 19A:
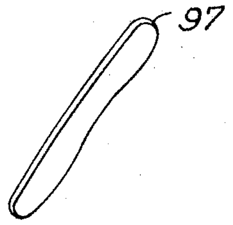
Figure 19B:
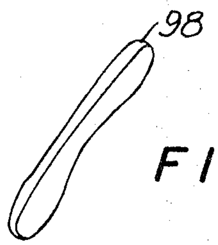
Figure 20:
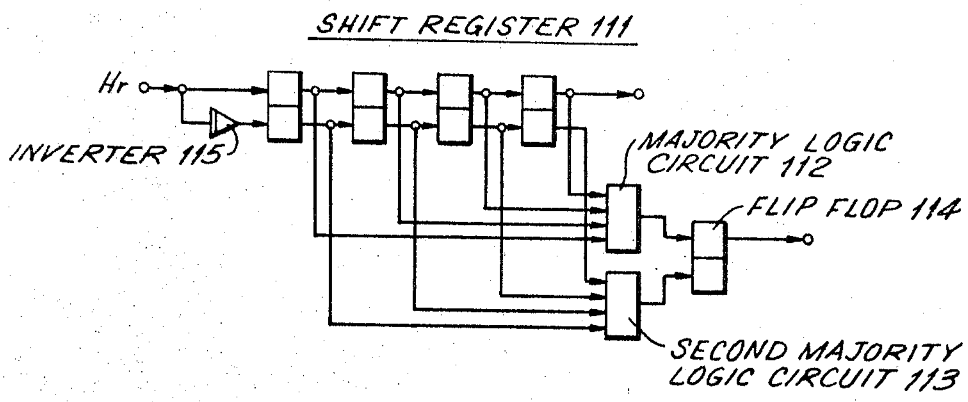
Figure 28A:
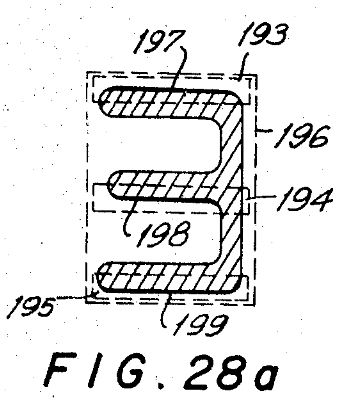
Figure 28B:
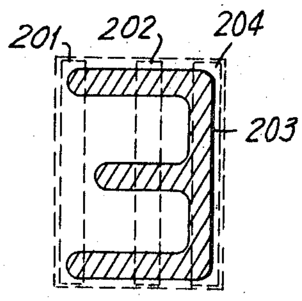
Figure 29A:
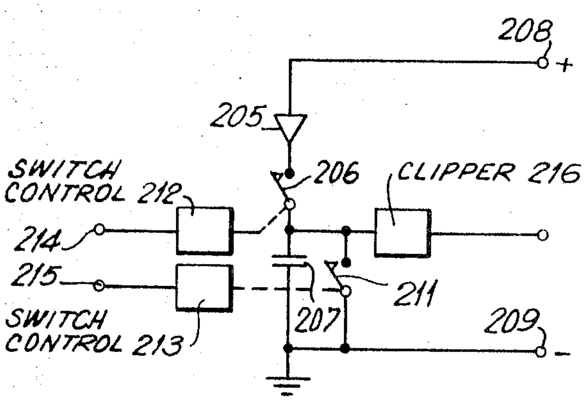
Figure 29B:
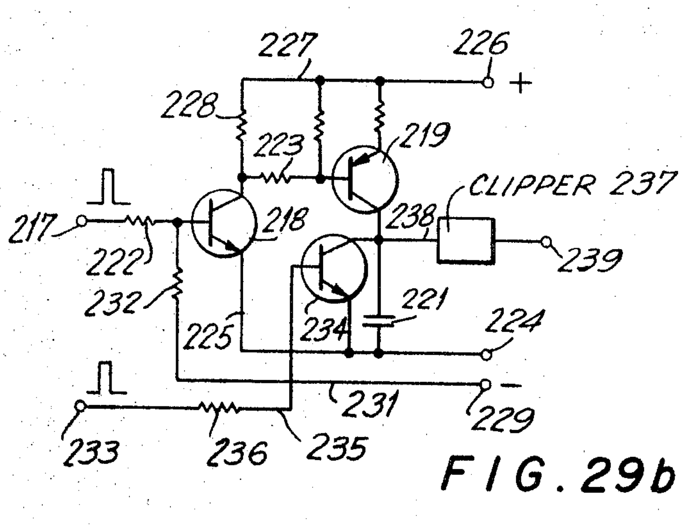

FIGS. 8*a*, 8*b* and 8*c* are graphical presentations for assisting in explaining the operation of the detection of rising and decaying parts of the scanning signals;

FIGS. 9 and 10 are diagrams for assisting in the explanation of the provision of signals provided by successively switching the signals for detecting the rising of horizontal scanning signals;

FIG. 11 is a diagram for assisting in illustrating the detection of the rising of vertical scanning signals;

FIG. 12 is a block diagram illustrating the principle of operation of the switching gate of FIG. 5;

FIG. 13 is a block diagram of an embodiment of a switching gate which may be utilized as the switching gate of FIG. 5;

FIG. 14*a*, 14*b*, 14*c*, 14*d* and 14*e* are diagrams illustrating embodiments of the signals for detecting the rising and decaying of horizontal and vertical signals;

FIG. 15 is a block diagram of an embodiment of a detector of oblique lines;

FIGS. 16*a*, 16*b*, 16*c* and 16*d* are diagrams illustrating the detection of oblique lines;

FIGS. 17*a*, 17*b*, 17*c* and 17*d* are diagrams illustrating the detection of vertical and horizontal lines;

FIG. 18 is a block diagram of an embodiment of a detector of horizontal lines;

FIGS. 19*a* and 19*b* are diagrams illustrating the principle of operation of the circuit of FIG. 18;

FIG. 20 is a block diagram of an embodiment of a detector of vertical lines;

FIGS. 21*a*, 21*b*, 21*c*, 22*a*, 22*b*, 22*c*, 22*d*, 23*a*, 23*b*, 23*c* and 23*d* are diagrams and graphical illustrations for aiding in explaining the detection of vertical lines;

FIGS. 24*a*, 24*b*, 24*c*, 24*d*, 24*e*, 25, 26*a*, 26*b* and 27 are diagrams; graphical illustrations and circuit diagrams for aiding in explaining the operation of the field positioning circuit of FIG. 5;

FIGS. 28*a* and 28*b* are diagrams for aiding in explaining the principle of stroke detection;

FIGS. 29*a* and 29*b* are circuit diagrams of an embodiment of a stroke detector; and FIGS. 30*a*, 30*b*, 30*c*, 30*d* and 30*e* are block diagrams, diagrams and graphical presentations illustrating a stroke detector and the principle of operation thereof.

The pattern recognizing system of the present invention recognizes or determines line patterns such as, for example, characters or marks. More particularly the pattern recognizing system of the present invention is a stroke system which recognizes or determines patterns or characters by separating such patterns or characters into their component parts. The pattern recognizing system of the present invention eliminates the difficulties of known pattern recognizing systems which utilize the stroke principle and is of high reliability in operation, although of simple structure.

Figure 1:
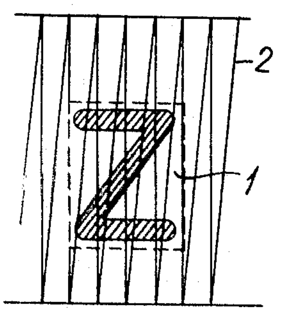

In the known pattern recognizing stroke system, as shown in FIG. 1, a character such as, for example, Z, is provided in a scanning field 1 and is scanned therein by a scanning line 2. The field 1, within which the character Z is scanned, is a quadrilateral circumscribing said character and is detected or determined initially. The operation of providing the scanning field 1 is known as positioning. The position in which the character or pattern appears, is initially determined or detected, and the type of line segments in the pattern and their parts in the quadrilateral pattern are determined. From these determinations, the character of pattern itself is determined.

Figure 2A:
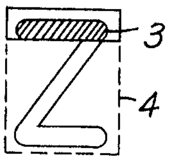
Figure 2B:
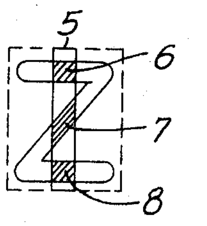

FIGS. 2*a* and 2*b* illustrate the detection of the upper horizontal line of the character Z. The upper horizontal line 3 of the character Z is within an observing field or area 4 in FIG. 22. As shown in the example of FIGS. 2*a* and 2*b*, when a part of the pattern or character extends over a part of the space of the observing field beyond a specific width, it is determined that a horizontal line exists therein. In FIG. 2*a*, the upper horizontal line 3 is detected.

FIG. 2*b* discloses a central vertical line observing field or area 5. Since the character Z does not include vertical lines, it is incorrect to consider parts 6, 7 and 8 of the character as appearing within the observing field 5 as parts of a vertical line. When the printing is very thick and the lines of a pattern or character become very thick, the aforementioned condition becomes very rigid and the central vertical line in this case cannot be a sufficiently meaningful characteristic from the viewpoint of reliability.

Figure 3A:
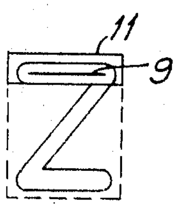
Figure 3B:
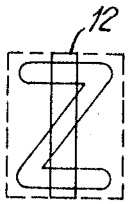
Figure 3C:
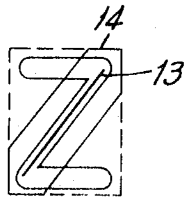

It is apparent that the aforedescribed defects may all be eliminated, the setting of the observing fields may be considerably facilitated and reliability may be considerably improved, if, as shown in FIGS. 3*a*, 3*b* and 3*c*, only a horizontal line 9 of a character appears in an observing field 11, for example, only the vertical component appears in an observing field 12 (FIG. 3*b*) and only a positive oblique line 13 appears in an observing field 14 (FIG. 3*c*). The components or constituents of a character or pattern are classified by their slopes and the observing fields are used only for the purpose of detecting the positions of lines within the quadrilateral scanning field which circumscribes the character.

Figure 4A:
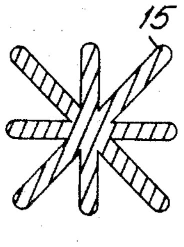
Figure 4B:
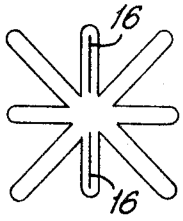
Figure 4C:
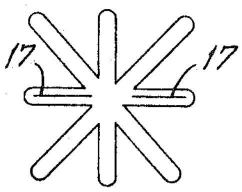
Figure 4D:
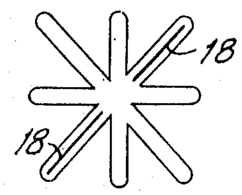
Figure 4E:
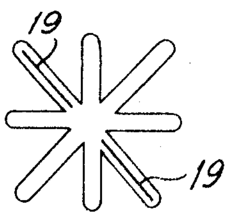

It would be desirable, if, for example, an input pattern 15, as shown in FIG. 4*a*, could be detected by detecting four types of line detecting lines. The types of line detecting lines are vertical line detecting lines 16 (FIG. 4*b*), horizontal line detecting lines 17 (FIG. 4*c*), positive oblique line detecting lines 18 (FIG. 4*d*) and negative oblique line detecting lines 19 (FIG. 4*e*). In accordance with the present invention, a character or pattern recognizing system determines the features of a pattern in two stages. The component or constituent lines of a character or pattern are classified in accordance with their slopes in the first stage and the positions of the classified lines in the quadrilateral circumscribed about the character are determined in the second stage.

We have already proposed the fundamental concept of the system of classifying the component or constituent lines of a line pattern by their slopes and taking out such constituent lines. This is disclosed in our Japanese Pat. application No. Tokugansho 41–74011, filed Nov. 10, 1966, and in our corresponding Pat. applications filed in the U.S., England, France and West Germany. The classifying system utilized in the system of the present invention is an embodiment of said concept and therefore said classifying system is not the subject of the present invention. The classifying system will, however, be described hereinafter to aid in providing a better understanding of the invention.

In FIG. 5, which is a block diagram of an embodiment of the present invention, a reading unit 21 comprises a plurality of photoelectric or photoresponsive elements linearly positioned and the readout currents provided by said photoresponsive elements are amplified and are converted into black and white horizontal scanning signals. Thus, a plurality of amplifiers 22 of a number equal to the number of the photoresponsive elements are provided, as well as analog to digital converters. A detector 23 detects the rising part and the decaying part of the horizontal scanning signals, provided by the reading unit 21. A converter 24 functions to convert horizontal scanning signals to vertical scanning signals at a high speed.

Switching gates 25 and 26 successively switch the signals produced by the detector 23 which are in accordance with the detection of the rising and decaying parts of the horizontal scanning signals. The rising and decaying signals switched by the gates 25 and 26 are passed through delay lines 27 and 28. The delay line 27 is connected to the output of the switching gate 25 and the delay line 28 is connected to the output of the switching gate 26. Each of the delay lines 27 and 28 functions to store signals required for the scanning of a single character for a period of time required for the positioning operation. A third delay line 29 is connected to the output of the horizontal to vertical scanning signal converter 24 and functions, in the manner of the delay lines 27 and 28, to store a signal required for the scanning of a single character for a period of time required for the positioning operation.

A detector 31 for detecting the rising part and the decaying part of the vertical scanning signals produced by the converter 24 is connected to the output of the delay line 29. A slope discriminator 32 or slope discriminating circuit, which functions to discriminate the component lines of a pattern or character by their slopes, is connected to the outputs of the delay line 27, the delay line 28 and the detector 31. A scanning field position detector 33 is connected to the output of the horizontal to vertical scanning signal converter 24 and comprises a positioning circuit which detects the part of the scanning field at which the pattern appears. A field divider 34 is connected to the output of the scanning field position detector 33 and functions to form a quadrilateral which is circumscribed about the pattern. The quadrilateral is formed by the field divider 34 in accordance with the information concerning the position of the pattern in the scanning field, provided by the position detector 33, and divides said quadrilateral into a plurality of observing fields.

A stroke detector or stroke detecting circuit 35 is connected to the output of the field divider 34 and to the outputs of the slope discriminator 32 and functions to combine the information concerning the lines of the pattern with the information concerning the position of such lines. The stroke detector 35 counts the line detecting signals produced by the slope discriminator 32 and classified by the slopes of the lines within the observing fields and also functions to detect various strokes. A character discriminator 36 is connected to the outputs of the stroke detector 35 and functions to discriminate the character or pattern by the combination of the detected strokes.

The reading unit 21 of the embodiment of FIG. 5 comprises a plurality of photoresponsive elements which are preferably linearly positioned relative to each other so that a pattern or character passes under the linear array of the photoresponsive elements. The photoelectric counts produced by the photoresponsive elements of the reading unit 21 are the output signals of said elements and correspond to the degrees of black and white of the pattern being scanned. The reading unit 21 extends in a vertical direction relative to the pattern for a length which is sufficient to cover the entire pattern or character when said pattern passes under said reading unit. The pattern may thus be adequately read out by the reading unit 21 even if the pattern shifts slightly in the vertical direction.

The produced photoelectric currents are amplified in amplifiers 22 to an extent wherein they attain a suitable signal level. The signal level is adjusted so that output signals of the same condition may be derived from all the channels when a specific input condition is imposed. The plurality of horizontal scanning signals, provided by the reading unit 21 and the amplifiers 22, are converted into black and white signals and are shaped in the amplifiers 22.

Figure 6:
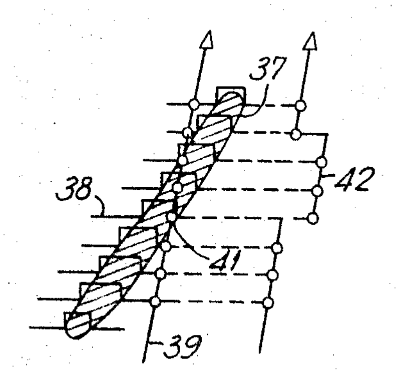
FIGS. 6 and 7 are diagrams illustrating the conversion of horizontal scanning signals to vertical scanning signals.

When a specific channel is observed in scanning a stroke 37, as shown in FIG. 6, a horizontal scanning signal is produced having a waveform which varies, as shown by the signal 38 of FIG. 6. The horizontal to vertical scanning signal converter 24 functions to derive vertical scanning signals from the horizontal scanning signals provided by the reading unit 21. Thus, as shown in FIG. 6, a conversion line 39 illustrates the timing at which a plurality of channels are successively converted. If the conversion may be accomplished in a very short period of time at the points of intersection 41 of the conversion line 39 and the channels, vertical scanning signals 42 are provided.

Figure 7:
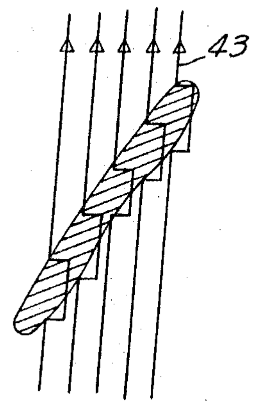

Vertical scanning signals 43, as shown in FIG. 7, may be provided by converting a plurality of horizontal scanning signals at high speed, as hereinbefore described. Thus, in the foregoing manner, horizontal and vertical scanning signals, scanning the pattern in the horizontal and vertical directions, respectively, are provided.

The slopes of the lines of the pattern may be classified into four types. The slopes of the lines may thus be horizontal, vertical, positive or negative. Signals for detecting the rising part and the decaying part of the horizontal and vertical scanning signals may be provided in advance and utilized in combination or independently to provide a determination or classification of the slopes of the lines of the pattern. The detector 23 of FIG. 5 detects the rising and decaying parts of the horizontal scanning signals and provides rising and decaying signals in accordance with such detection. The detector 31 detects the rising and decaying parts of the vertical scanning signals and provides rising and decaying signals in accordance with such detection. FIG. 8*b* shows a signal 44 which is utilized to detect the rising part of a scanning signal 45 disclosed in FIG. 8*a*. FIG. 8*c* shows a signal 46 which is utilized to detect the decaying part of the scanning signal 45. Each of the detecting signals 44 and 46 has a pulse duration 47 which is constant in magnitude and which is determined so that the succeeding operations may be facilitated.

When a signal is utilized to detect the rising part of a horizontal scanning signal, a stroke 48 may be scanned as shown in FIG. 9, for example. The hatched portion 49 on the left of the stroke 48 may be detected. The switching gate 27 of FIG. 5 functions to switch the horizontal rising signals successively. In FIG. 9, a switching line 51 is provided. If the switching of the switching gate 25 is performed at the points of intersection 52 of the switching line 51 and the channels, a signal 53 is provided. When signals for detecting the rising part of the horizontal scanning signals are read out in series and a stroke is scanned in the manner shown in FIG. 10, the signal 53 detects only the left edge 54 (FIG. 10) of the stroke.

The switching gate 26 of FIG. 5 functions to successively switch signals for detecting the rising of the horizontal scanning signals, so that signals read out in series for detecting the decaying of the horizontal scanning signals may be obtained in the same manner as hereinbefore described. The delay line 29 of FIG. 5 delays the vertical scanning signals provided by the horizontal to vertical scanning signal converter 24 and provides an output which is supplied to the detector 31 for detecting the rising part and the decaying part of the vertical scanning signals. This operation is shown in FIG. 11, wherein a waveform 55 is provided by varying the waveform of the scanning signal provided by scanning a stroke 56. The waveform 55, as shown in FIG. 11, varies. A signal 57 detects the rising part of the vertical scanning signal, and a cross-hatched portion 58 on the lower part of the stroke 56 is eventually detected. Thus, a signal V*r* (FIGS. 5, 14*d* and 15) for detecting the rising part of the vertical scanning signal is obtained. A signal V*f* (FIGS. 5, 14*e* and 15) for detecting the decaying part of the vertical scanning signal may be provided in a similar manner.

Signals readout in series for detecting the rising and decaying of horizontal scanning signals provided in the aforedescribed manner are supplied to the delay lines 27 and 28 of FIG. 5 and are delayed by said delay lines for a specific period of time before they are supplied to the slope discriminating circuit 32. The slope discriminating circuit 32 classifies the rising and decaying signals into line detecting signals in accordance with the slopes of the lines of the line pattern. The signals supplied to the slope discriminator 32 by the delay lines 27 and 28 are H*r* (FIGS. 5, 14*b* and 15) for detecting the rising part of the horizontal scanning signal, and H*f* (FIGS. 5, 14*c* and 15) for detecting the decaying part of the horizontal scanning signal, respectively.

In FIG. 12, which is for the purpose of explaining the operation of the switching gates 25 and 26 and the horizontal to vertical scanning signal converter 24, a switching gate 59 successively switches the signals H*r* for detecting the rising of the horizontal scanning signals, a switching gate 61 successively switches the signals H*f* for detecting the decaying of the horizontal scanning signals and a switching gate 62 successively switches the horizontal scanning signals themselves. The switching gates 59, 61 and 62 are schematically represented by rotary switches. The rotary switches 59, 61 and 62 are interlocked by being intercoupled via a mechanical coupling 63 and are cyclically driven via a rotary switch driver 64 and said mechanical coupling.

Figure 14A:
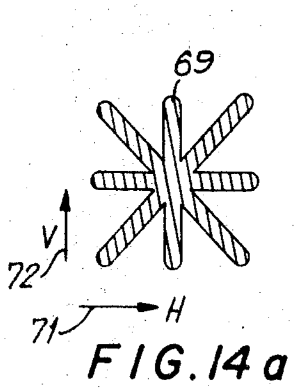

FIG. 13 is a logical circuit which replaces the rotary switches of FIG. 12. In FIG. 13, each of a plurality of inputs 65 is connected to one input terminal of a corresponding one of a plurality of AND gates 66. Each of the outputs of a pulse distributor 67 is connected to the other input of a corresponding one of the AND gates 66. The outputs of the AND gates 66 are connected as inputs of an OR gate 68. The signals H*r* for detecting the rising of the horizontal scanning signals, the signals H*f* for detecting the decaying of the horizontal scanning signals, the signals V*r* for detecting the rising of the vertical scanning signals and the signals V*f* for detecting the decaying of the vertical scanning signals are supplied to the slope discriminator 32 of FIG. 5. FIGS. 14*b*, 14*c*, 14*d* and 14*e* illustrate diagrammatically the signals H*r*, H*f*, V*r* and V*f*, respectively. If a pattern 69, as shown in FIG. 14*a*, is scanned in the horizontal direction, indicated by an arrow 71, and is also scanned in the vertical direction, indicated by an arrow 72, black portions 73 representing the signals H*r* (FIG. 14*b*), black portions 74 representing the signals H*f* (FIG. 14*c*), black portions 75 representing the signals V*r* (FIG. 14*d*) and black portions 76 representing the signals V*f* (FIG. 14*e*) are observed.

Figure 14B:
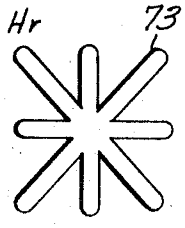
Figure 14C:
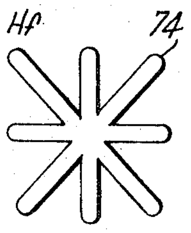
Figure 14D:
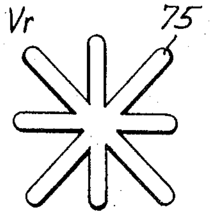

The four types of detecting signals H*r*, H*f*, V*r* and V*f* may be distinguished from oblique lines by AND gates, as shown in FIG. 15. Thus, for example, the signals H*r* and V*r* are supplied to the inputs of an AND gate 78 in FIG. 15. If H*r* and V*r* are compared, as shown in FIGS. 14*b* and 14*d*, it is seen that the lower portions of the two negative oblique lines of these FIGS. coincide with each other. Such lower portions are the same as the black portion 79 of FIG. 16*d*. The same principle applied to the signals H*f* and V*f*, which are supplied to an AND gate 81 of FIG. 15. In this case, the upper portions of the oblique lines of FIGS. 14*c* and 14*e* coincide with each other and are the same as the black portion 82 of FIG. 16*c*. The signals H*r* and V*f* are supplied to the inputs of an AND gate 83 of FIG. 15. In a comparison of FIGS. 14*b* and 14*e*, it is seen that the upper portions of the oblique lines coincide with each other and are the same as the black portion 84 of FIG. 16*a*. The signals H*f* and V*r* are applied to the inputs of an AND gate 85 of FIG. 15. In comparing FIGS. 14*c* and 14*d*, it is seen that the lower portions of the oblique lines coincide with each other and are the same as the black portion 86 of FIG. 16*b*.

Figure 14E:
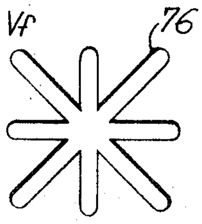
Figure 16A:
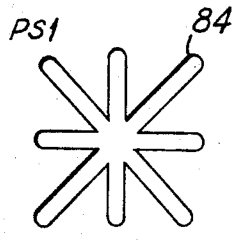
Figure 16B:
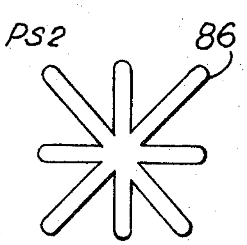
Figure 16C:
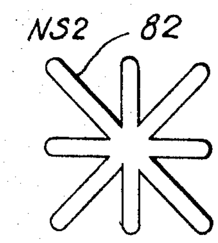
Figure 16D:
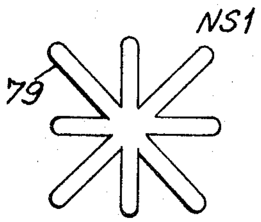

The foregoing illustrates the fact that oblique lines may be classified into positive and negative oblique lines in accordance with their slopes, and that, moreover, the corresponding detecting signals may be provided at both the upper and lower portions of an oblique line separately from each other. The signals indicating the slopes and the detecting signals are designated PS1 (FIG. 16*a*), PS2 (FIG. 16*b*), NS2 (16*c*) and NS1 (FIG. 16*d*). PS1 and PS2 are the positive slope signals and NS1 and NS2 are the negative slope signals. Oblique lines may be detected or determined in the aforedescribed manner and horizontal and vertical lines may be detected or determined by utilizing the oblique lines. In FIGS. 14*b* and 14*c*, the horizontal lines are not detected, but the vertical lines and the oblique lines are detected. In FIGS. 14*d* and 14*e*, the vertical lines are not detected, whereas the horizontal lines and the oblique lines are detected. If the signals corresponding to the oblique lines are removed from the detecting signals H*r*, H*f*, V*r* and V*f*, vertical lines remain in H*r* and H*f* and horizontal lines remain in V*r* and V*f*.

Figure 17A:
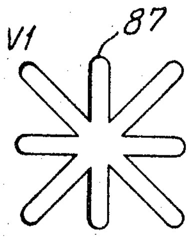
Figure 17B:
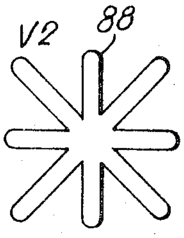
Figure 17C:
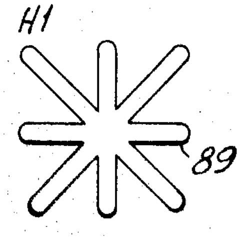
Figure 17D:
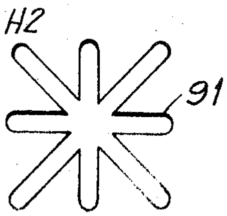

In FIGS. 17*a* and 17*b*, the oblique line components are removed from H*r* and H*f* and only the vertical line components 87 and 88, respectively, remain. In FIGS. 17*c* and 17*d*, the oblique line components are removed from V*r* and V*f* and only the horizontal line components 89 and 91, respectively, remain. Thus, for example, a horizontal line detecting signal H1, as shown in FIG. 17*c*, may be provided by removing the signals NS1 and PS2 from the V*r* signal (FIG. 14*d*). A horizontal line detecting signal H2, as shown in FIG. 17*d*, may be provided by removing NS2 and PS1 from the V*f* signal (FIG. 14*e*). A vertical line detecting signal V1, as shown in FIG. 17*a*, may be provided by removing PS1 and NS1 from the H*r* signal (FIG. 14*b*). A vertical line detecting signal V2, as shown in FIG. 17*b*, may be provided by removing PS2 and NS2 from the H*f* signal (FIG. 14*c*).

FIG. 18 is an embodiment of an oblique line erasing circuit. In order to explain the operation of the oblique line erasing circuit of FIG. 18, the providing of the horizontal line detecting signal H2, as shown in FIG. 17*d*, *will be explained by*

*describing the removal of NS2 and PS1 from the Vf* signal, as shown in FIG. 14*e*. The output signals PS1 and NS2 for detecting the oblique lines to be removed or erased, are supplied to the input terminals of an OR gate 92. The output of the OR gate 92 is supplied to a shift register 93 which comprises three flip-flops 94*a*, 94*b* and 94*c*. The output of the OR gate 92 is directly connected to the set input of the flip-flop 94*a* and is connected to the reset input of the flip-flop 94*a* via an inverter 95. The reset output of the flip-flop 94*a* is connected to one input of an AND gate 96, the reset output of the flip-flop 94*b* is connected to another input of said AND gate and the reset output of the flip-flop 94*c* is connected to a third input of said AND gate.

The operation of the aforedescribed circuit of FIG. 18 is explained by the illustration of FIGS. 19*a* and 19*b*. If the output of the OR gage 92 of FIG. 18 is the portion 97 of FIG. 19*a*, the width of the output signal of the AND gate 96 is increased, as shown by the portion 98 of FIG. 19*b*. The portion 98 of FIG. 19*b* is actually provided at the reset or 0 output of the shift register 93, which is the 0 or reset output of the flip-flop 94*c*. Thus, the signal 92 is actually a signal of opposite polarity from the signal 91 and the oblique line components of the *Vf* signal may be removed by utilizing said signal 92. At such time, the oblique line erasing signal has a duration which is sufficient to cover the oblique line component in the *Vf* signal.

The output of the AND gate 96 of FIG. 18 is connected to an input terminal 99 of a shift register 101. The input terminal 99 and an input terminal 102 of the shift register 101 constitute a dual input AND gate. As evident from the foregoing disclosure, when either of the oblique line components PS1 and NS2 is detected, the portion corresponding to the oblique line component of the signal *Vf* is not transferred by the AND gate and a horizontal line detecting signal H2 is eventually provided as the output signal of the shift register 101. The detecting signal *Vf* is supplied to the input 102 of the shift register 101 via the set input and output. The detecting signal *Vf* is also supplied to an input 104 of the shift register 101 via an inverter 105 and the reset input and output of the flip-flop 103.

Figure 21A:
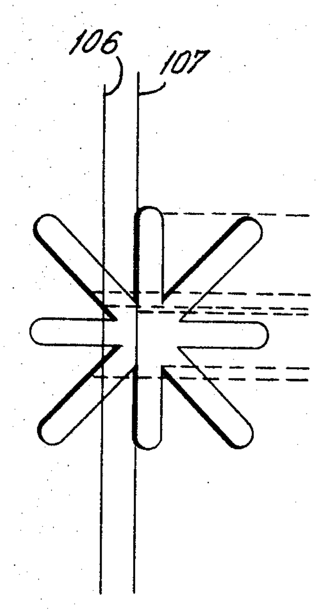
Figure 21B:
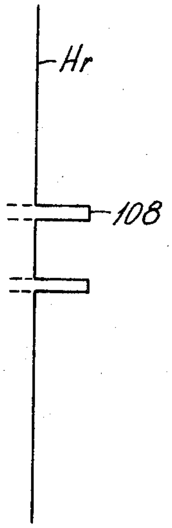
Figure 21C:
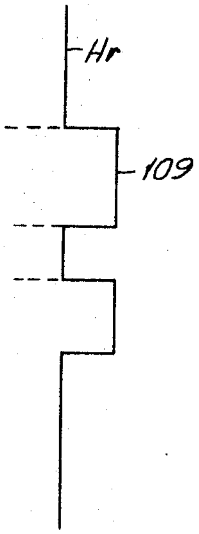

The horizontal line detecting signal H1 may be provided in the same manner as described for providing the horizontal line detecting signal H2. Furthermore, it is also possible to maintain only the vertical line component in the *Hr* and *Hf* signals by utilizing the same operation with regard to the vertical line. However, the vertical line may be determined by a more advantageous method. FIG. 20 is a circuit for detecting the vertical line. FIGS. 21*a*, 21*b* and 21*c* aid in explaining the operation of FIG. 20. in FIG. 21*a*, scanning lines 106 and 107 are shown. The waveforms of the *Hr* signals corresponding to the scanning lines 106 and 107 of FIG. 21*a* are varied, as shown in the curves 108 and 109 of FIGS. 21*b* and 21*c*, respectively. The pulse duration is long in the curve 109 of FIG. 21*c* when the *Hr* signal is on the vertical line and the pulse duration is short, as shown by the curve 108 of FIG. 21*b*, at other times. The vertical line may be separated by noticing the pulse duration of the *Hr* signal.

In FIG. 20, the *Hr* signal is fed to a shift register 111. The set or 1 outputs of the four component flip-flops of the shift register 111 are connected as inputs to a majority logic circuit 112. The reset or 0 outputs of the flip-flops of the shift register 111 are connected to a second majority logic circuit 113. The outputs of the majority logic circuits 112 and 113 are connected to the set or 1 input of a flip-flop 114 and to the reset or 0 input thereof, respectively. The input *Hr* signal is directly supplied to the set input of the first flip-flop of the shift register 111 and is supplied to the reset input thereof via an inverter 115.

Figure 22A:
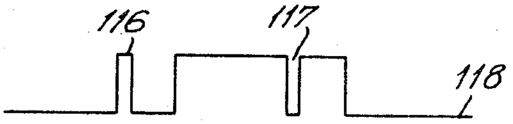
Figure 22B:
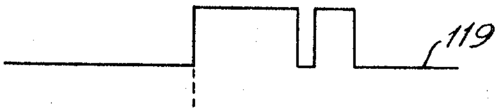
Figure 22C:
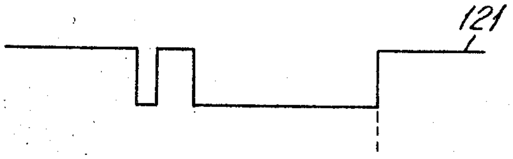
Figure 22D:
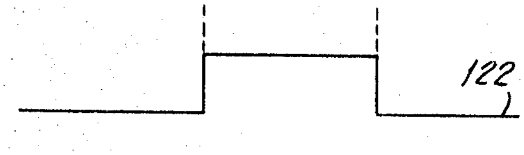

When the waveform of the *Hr* signal is varied as shown in FIG. 22*a*, the circuit of FIG. 20 functions as follows. It is assumed that each of the majority logic circuits 112 and 113 of FIG. 20 produces a 1 signal only when more than three out of the four inputs thereto supply a 1 signal. It is also assumed that the duration of noise components 116 and 117 of the waveform 118 of FIG. 22*a* is two bit lengths in the shift register 111 of FIG. 20. The waveform of the output signals of the majority logic circuit 112 then varies as shown by the waveform 119 of FIG. 22*b* and the waveform of the output signals of the second majority logic circuit 113 varies as shown by the waveform 121 of FIG. 22*c*. The output waveform of the 1 or set output of the flip-flop 114 of FIG. 20 varies as shown by the waveform 1—2 of FIG. 22*d*. A comparison of the waveforms 118 and 122 of FIGS. 22*a* and 22*d* indicates that the noise components 116 and 117 (FIG. 22*a*) are removed and only the initial signal component is faithfully reproduced.

The vertical line is a pattern or character 3, for example, may be determined or detected in a manner illustrated in FIGS. 23*a*, 23*b*, 23*c* and 23*d*, by utilizing the circuit of FIG. 20. FIG. 23*a* represents the signal *Hr* and FIG. 23*b* represents the signal *Hf*. When the vertical line detecting circuit of FIG. 20 is applied to FIGS. 23*a* and 23*b*, the outputs indicated in FIGS. 23*c* and 23*d* are provided. In the *Hr* signal (FIG. 23*a*), the left end part 123 of the horizontal line is removed or erased and only the part 124 (FIG. 23*c*) remains. In the *Hf* signal (FIG. 23*b*), a cavity or indentation 125 is removed or erased and a continuous vertical line 126 (FIG. 23*d*) is provided.

In FIG. 5, the horizontal line detecting signals H1 and H2, the vertical line detecting signals V1 and V2, the positive oblique line detecting signals PS1 and PS2 and the negative oblique line detecting signals NS1 and NS2, that is, eight signals, may be provided as the output of the slope discriminating circuit 32. Each of the four types of detecting signals classified by the slope discriminator 32 comprises two signals and detects a line at the upper and lower portions thereof. Thus, for example, in FIG. 23*d*, the vertical line on the right side of the character 3 is detected by the signal V2, and it is more desirable in this case not to use the signal V1, as shown in FIG. 23*c*, to detect the vertical line. As illustrated by this example, the system of the present invention provides an operation in which in detecting various strokes which constitute a pattern or character, the detecting signal better suited for the detection of the stroke may be selected from the two types of detecting signals on the two sides or portions of the line.

In FIG. 5, the scanning field position detector 33 detects a field in which the line pattern exists within the field of the scanning signals and sets a plurality of observing fields within the field. That is, the scanning field position detector 33 determines in which part of the scanning field the pattern or character appeared prior to the determination of various information therefrom. FIGS. 24*a*, 24*b*, 24*c*, 24*d* and 24*e* illustrate the operation of the positioning circuit 33. Thus, for example, if the pattern or character is an 0 or a P, the output of the circuit for determining the highest position of the pattern and the output of the circuit for determining the lowest position of the pattern are varied, as indicated by the areas 127 and 128 of FIG. 24*a*, which extend respectively from the left front edge of the pattern to the rear edge thereof. The highest position determining circuit determines the highest position of the pattern within the scanning field and the lowest position determining circuit determines the lowest position of the pattern within the scanning field. The information of the position of the pattern is directly converted into analog voltages and is recorded or stored.

The highest position of the pattern and the lowest position of the pattern may be determined completely when the scanning of said pattern has been completed. The information is transferred to another storage device and the position determining circuit is returned to its initial condition. In FIG. 24*d*, information transferring pulses 129 are illustrated, and in FIG. 24*e*, reset pulses 131 are illustrated. In FIG. 24*a*, the area 127 corresponds to the output of the highest position determining circuit and the area 128 corresponds to the output of the lowest position determining circuit. These outputs are transferred to the storage when the scanning of the pattern is completed. The transferred information is stored until the instant of the next transfer pulse, and the output waveforms of the highest position storage circuit and the lowest position storage circuit are varied, as shown by the waveforms 132 and 133 of FIGS. 24*b* and 24*c*, respectively.

The delay lines 27, 28 and 29 of FIG. 5 function to delay the information by a period of time required for the aforementioned positioning operation. The information 134 (FIG. 24*a*) is changed to information 135 (FIG. 24*b*) by being delayed in a delay line, and is provided as the output signal. At such such instant, the highest position storage circuit and the lowest position storage circuit store the information concerning the position of the pattern, so that eventually a circumscribing quadrilateral 136, as shown in FIG. 24*b*, is provided.

Figure 25:
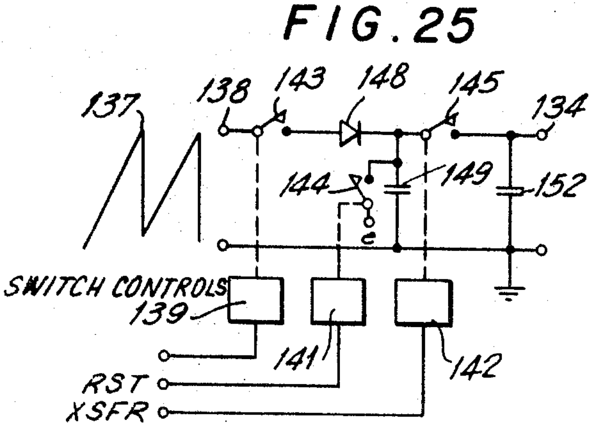
Figure 26A:
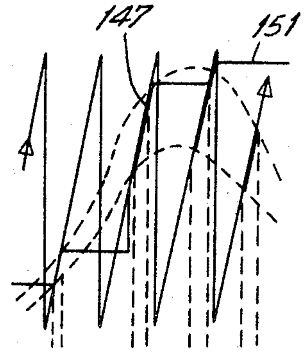
Figure 26B:
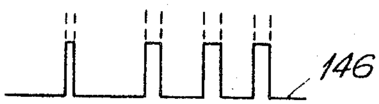

FIG. 25 is a circuit which illustrates the principle of operation of the positioning circuit. The highest position determining and storage circuit is described with reference to FIG. 25. The description relating to the highest position determining and storage circuit also applies to the lowest position determining and storage circuit. A sawtooth wave 137, which corresponds to the vertical scanning, is supplied to an input terminal 138. The sawtooth wave 137 may be provided by a direct conversion of the position of the scanning field into a voltage. A plurality of switch control circuits 139, 141 and 142 each controls a corresponding one of a plurality of switches 143, 144 and 145. If vertical scanning signals such as, for example, the signals 146 of FIG. 26*b*, are supplied to the switch control circuit 139, said switch control circuit closes the switch 143 for a period of time in which the vertical scanning signals are 1. The vertical scanning signals are the input signals supplied to the scanning field position detector 33 of FIG. 5 and are the black and white signals at the time that the pattern is scanned in the vertical direction.

The black and white portions of the sawtooth wave are sampled, as shown by the line 147 of FIG. 26*b*. Due to the directional conductivity of a diode 148, connected between the switches 143 and 145 of FIG. 25, the potential of a capacitor 149, which is connected between a common point in the connection of the diode 148 and the switch 145 and a point at ground potential, reaches a level 151, as shown in FIG. 26*a*. The capacitor 149 stores the highest magnitude of the sampled potentials. When the scanning of a pattern or character is completed, as hereinbefore described, a voltage converted from the highest position of the scanned pattern is stored in the capacitor 149. At such instant, the information transferring pulse 149 of FIG. 24*d* is supplied to the switch control circuit 142 which closes the switch 145 only for a period of time in which the signals are 1 and the potential of the capacitor 149 is transferred to a capacitor 152 without modification. The capacitor 152 is connected in parallel with the capacitor 149, on the other side of the switch 145. Upon completion of the transfer of information, the reset pulse 131 is supplied to the switch control circuit 141 which then closes the switch 144, and the capacitor 149 is returned to its initial condition.

Figure 27:
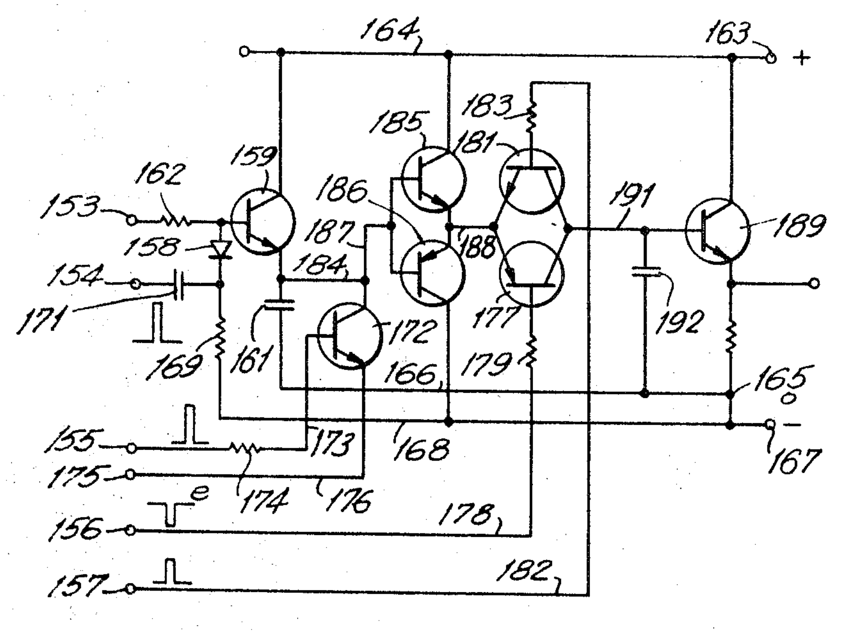

FIG. 27 is a circuit diagram of an embodiment of the scanning field position detector 33 of FIG. 5. Sawtooth waves are supplied to an Positive terminal 153. Readout signals are supplied to an input terminal 154. Reset pulses are supplied to a terminal 155. Negative information transferring pulses are supplied to a terminal 156. Positive information transferring pulses are supplied to a terminal 157. When a positive readout pulse is supplied to the terminal 154, a diode 158 is biased in a nonconductive direction and a transistor 159 is switches to its conductive condition only when the magnitude of the sawtooth wave at that instant is higher than the emitter potential of the transistor 159, and a capacitor 161 is charged rapidly until such magnitude of the sawtooth wave is reached.

The input terminal 153 is connected to the base electrode of the transistor 159 via a resistor 162. The collector electrode of the transistor 159 is connected to the positive terminal 163 of a source of DC supply voltage via a positive voltage lead 164. The emitter electrode of the transistor 159 is connected to a zero voltage point 165 via a lead 166 and the capacitor 161 connected in said lead. The base electrode of the transistor 159 is connected to the negative terminal 167 of the source of DC supply voltage via a negative voltage lead 168 and the diode 158 and a resistor 169 connected in series in said lead. The input terminal 154 is connected to a common point in the connection between the diode 158 and the resistor 169 via a capacitor 171. The terminal 155 is connected to the base electrode of a transistor 172 via a lead 173 and a resistor 174 connected in said lead. A terminal 175 is directly connected to the emitter electrode of the transistor 172 via a lead 176. The terminal 156 is connected to the base electrode of a transistor 177 via a lead 178 and a resistor 179 connected in said lead. The terminal 157 is connected to the base electrode of a transistor 181 via a lead 182 and a resistor 183 connected in said lead.

The emitter electrode of the transistor 159 is connected to the collector electrode of the transistor 172 via a lead 184 and is connected to the base electrode of a transistor 185 and a transistor 186 via the lead 184 and a lead 187. The transistors 185 and 186 have a common emitter connection and the transistors 181 and 177 have a common emitter connection connected to that of the transistors 185 and 186 via a lead 188. The transistors 177 and 181 have a common collector connection which is connected to the base electrode of a transistor 189 via a lead 191. A capacitor 192 is connected between the leads 191 and 166. The transistor 172 functions as a reset gate and when a positive pulse is supplied to the base electrode of said transistor, said transistor discharges the capacitor 161 rapidly until the reset level *e* is reached. The potential of the capacitor 161 is transferred to the transistors 177 and 181, which function as an analog switch, through the transistors 185 and 186, which function as a buffer. If negative and positive transferring pulses are supplied via the input terminals 156 and 157, respectively, the terminal voltage of the capacitor 161 is eventually transmitted to the capacitor 192.

The circuit for determining the lowest position of the pattern or character may be constituted in nearly the same manner as that of FIG. 27, and the output of the circuit for storing the lowest position of the pattern is varied in the manner of the curve 133 of FIG. 24*c*. The front edge of the pattern in the horizontal direction may be readily detected by observing the vertical scanning signal. An instant, delayed from the instant by a specific period of time determined by considering the delay time of the delay line, may be used as the front edge in the horizontal direction at the time of the recognition. Thus, the quadrilateral 136 circumscribed about the delayed pattern information 135 may be provided, as shown in FIGS. 24*b* and 24*c*.

The field divider 34 of FIG. 5 for forming a quadrilateral may comprise any suitable circuit for dividing the interior of the circumscribed quadrilateral. The field divider 34 may comprise a counter for distributing the field in the vertical and horizontal directions. The stroke detector of FIG. 5 is a stroke detecting circuit which functions to combine the slope discriminating output with the field distributing output and to provide the information as to what types of segments of lines were detected in what positions within the quadrilateral.

FIGS. 28*a* and 28*b* illustrate the detection of the strokes of a character 3 as an example. FIG. 28*a* shows the detection of horizontal lines and FIG. 28*b* shows the detection of vertical lines. In FIG. 28*a*, observing fields 193, 194 and 195 are positioned or set within a quadrilateral 196 circumscribed about the character 3 by the field dividing circuit 34 of FIG. 5 in order to detect the horizontal lines of the character 3. As hereinbefore described, line detecting signals are detected on both sides or portions of the line. The upper horizontal line may be detected more advantageously by the use of the signal H2 rather than the signal H1. Adversely, it is more advantageous to use the signal H1 in the detection of the lower horizontal line. The central horizontal line of the character 3 may be detected by the signal H1 or the signal H2 under the same conditions, but in FIG. 28*a*, the signal H1 is utilized. Thus, horizontal line detecting signals 197, 198 and 199 may be detected within the observing fields 193, 194 and 195.

In FIG. 28*b*, if the signal V1 is used for the detection of the left vertical line and the central vertical line and the signal V2 is used for the detection of the right vertical line, no detecting signal appears in the observing fields 201 and 202 and a vertical line detecting signal 203 appears in observing field 204. Obviously, oblique lines may also be detected by the use of signals suited for the detection thereof selected from the signals PS1, PS2, NS1 and NS2, depending upon the observing field.

In detecting various strokes, the duration or length of the detecting signal appearing in the observing field is measured and if said duration is greater than a specific magnitude, it is determined that the corresponding stroke exists and if said duration is less than said specific magnitude, it is determined that the stroke does not exist. The pulse durations of both horizontal line detecting signals H1 and H2 are constant and magnitudes, levels or values available by directly integrating said signals directly correspond to the lengths of the horizontal lines.

In order to detect oblique lines, the pulse duration of the detecting signal is made constant and the magnitude available by integrating the detecting signal in this case also corresponds to the length of the oblique line. In the case of the vertical line, the value available by directly integrating the detecting signal for each scan corresponds to the length of the straight line. It is, as hereinbefore described, an advantage of the pattern recognizing system of the present invention that the length of a line may be measured satisfactorily by a simple integrator as the detecting signal is normalized.

FIGS. 29*a* and 29*b* illustrate a simple integrator for determining the length of a line. FIG. 29*a* illustrates the principle of operation of the circuit, which converts the pulse lengths of the detecting signals into voltages and accumulates them. In FIG. 29*a*, a constant current source 205 is connected in series circuit arrangement with a switch 206 and a capacitor 207 between the positive terminal 208 and the negative terminal 209 of a source of DC voltage supply. A switch 211 is connected across the capacitor 207. A switch control 212 controls the operation of the switch 206 and a switch control 213 controls the operation of the switch 211.

In FIG. 29*a*, when the switch 206 is ON or closed, the capacitor 207 is charged by a constant current. The voltage across the capacitor 207 reaches a magnitude which is proportional to the period of time during which the switch 206 is closed or conductive. The switch control 212 maintains the switch 206 closed only while line detecting signals are supplied to said switch control via a terminal 214. The switch 211 discharges the capacitor 207 and is closed or conductive while reset pulses are supplied to the switch control 213 via a terminal 215, so that said capacitor rapidly returns to its initial condition. A clipper 216 is connected to a common point in the connection between the switch 206 and the capacitor 207. The output of the clipper 216 is 1 if the voltage across the capacitor 207 is greater than a specific constant magnitude and is 0 if said voltage is less than said magnitude.

FIG. 29*b* discloses a circuit of an integrator for detecting strokes. When a positive line detecting signal is supplied to an input terminal 217, it switches a transistor 218 to its conductive condition and causes the base electrode of a transistor 219 to be biased in the forward direction. A capacitor 221 is charged by a constant current. The input terminal 217 is connected to the base electrode of the transistor 218 via a resistor 222. The collector electrode of the transistor 218 is connected to the base electrode of the transistor 219 via a resistor 223. The emitter electrode of the transistor 218 is connected to a point 224 at zero potential via a lead 225 and the collector electrode of said transistor is connected to the positive terminal 226 of a source of DC supply voltage via a lead 227 and a resistor 228 connected in said lead. The base electrode of the transistor 218 is connected to the negative terminal 229 of the source of DC supply voltage via a lead 231 and a lead 232 connected in said lead.

An input terminal 233 is connected to the base electrode of a transistor 234 via a lead 235 and a resistor 236 connected in said lead. The collector electrodes of the transistors 219 and 234 are connected in common to the point 224 at zero potential via the capacitor 221 and to a clipper 237 via a lead 238. The output of the clipper 237 is provided at an output terminal 239. The clipper 237 may comprise any suitable known clipper. The clipper 237 has a high input impedance and provides an output of 1 if the voltage across the capacitor 221 is greater than a constant specific magnitude and provides an output of 0 if said voltage is less than said constant magnitude. When a positive reset pulse is supplied to the input terminal 233, the transistor 234 is switched to its conductive condition and the capacitor 221 is discharged rapidly.

Figure 30A:
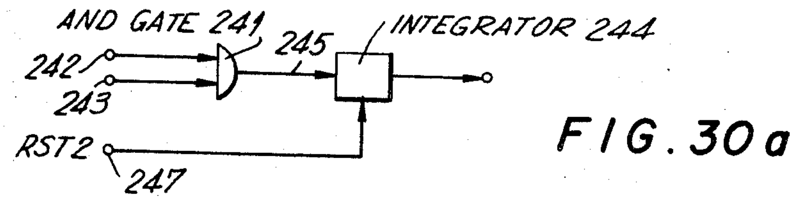
Figure 30B:
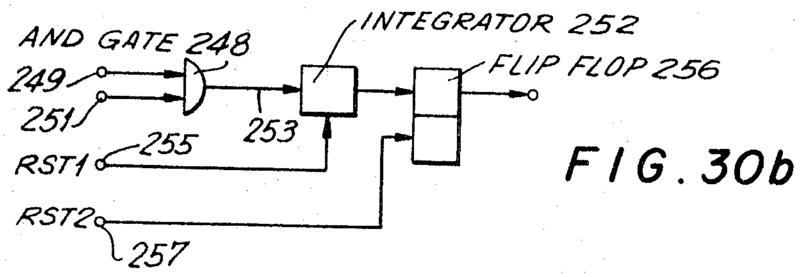
Figure 30C:
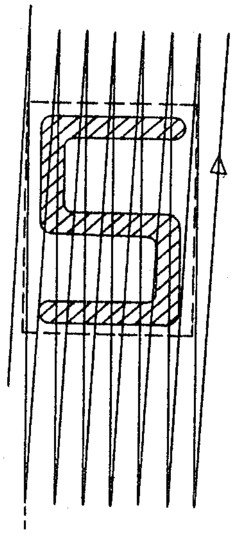
Figure 30D:
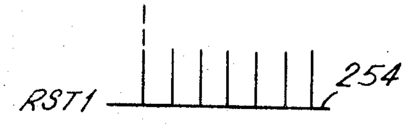
Figure 30E:
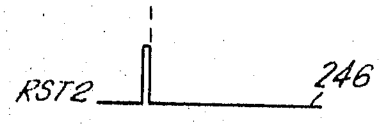

FIGS. 30*a*, 30*b*, 30*c*, 30*d* and 30*e* illustrate a stroke detecting circuit utilizing the integrator of FIG. 29*b*. FIG. 30*a* shows a circuit for detecting horizontal and oblique lines. Detecting signals are supplied to one of the two inputs of an AND gate 241 via one of the input terminals 242 and 243 and the output of the field dividing circuit 34 (FIG. 5) is connected to the other input of said AND gate via the other of said input terminals. An integrator 244 has an input connected to the output of the AND gate 241 via a lead 245. A reset pulse 246, as shown in FIG. 30*e*, is supplied via an input terminal 247 to the integrator 244. As shown in FIG. 30*e*, the reset pulse 246 is produced slightly before the front edge of a character or pattern. Horizontal signal components are integrated when the rear edge of the character or pattern is reached and it is indicated whether or not there are corresponding horizontal lines. The oblique lines may also be detected by the use of the same detecting circuit.

FIG. 30*b* shows a circuit for detecting vertical lines. Vertical line detecting signals are supplied to one of the two inputs of an AND gate 248 via one of input terminals 249 and 251 and the output of the field dividing circuit 34 of FIG. 5 is connected to the other input of said AND gate via the other of said input terminals. An integrator 252 has an input connected to the output of the AND gate 248 via a lead 253. A reset pulse 254, as shown in FIG. 30*d*, is supplied to the integrator 252 via an input terminal 255. As shown in FIG. 30*d*, the reset pulse 254 is produced at the initial point of scanning. As hereinbefore described, in the detection of the vertical line, the pulse duration of the vertical line detecting signal for each scanning is detected. If the output of the integrator 252 is 1 during the scanning, the result is stored in a flip-flop 256. The reset pulse 246 is supplied to the other input terminal of the flip-flop 256 via an input terminal 257. The flip-flop 256 is connected to the output of the integrator 252. The result of the detection of the vertical line is stored until the next-succeeding pattern appears. When all the features have been determined, the result is transferred to a discriminating logic circuit, which may comprise a diode gate.

As hereinbefore described, the pattern recognizing system of the present invention eliminates many of the disadvantages of known stroke detecting systems and functions as a simple and highly reliable character recognizing system.

While the invention has been described by means of specific examples and in specific embodiments, we do not wish to be limited thereto, for obvious modifications will occur to those skilled in the art without departing from the spirit and scope of the invention.

We claim:

1. A pattern recognizing system for determining a line pattern, said system comprising reading means for scanning the line pattern in mutually perpendicular coplanar directions and for providing scanning signals in accordance with such scanning;

detector means connected to said reading means for detecting the rising and decaying parts of said scanning signals in each of said directions and for providing rising and decaying signals in accordance with such detecting;

slope discriminating means connected to said detector means for classifying said rising and decaying signals into line detecting signals in accordance with the slopes of the lines of said line pattern;

scanning field position detecting means connected to said reading means for detecting a field in which the line pattern exists within the field of the scanning signals and for setting a plurality of observing fields within said field;

stroke detecting means connected to said slope discriminating means and to said scanning field position detecting means for counting said line detecting signals classified by the slopes of lines within said observing fields and for detecting various strokes; and character discriminating means connected to said stroke detecting means for discriminating the line pattern by the combination of the detected strokes.

2. A pattern recognizing system as claimed in claim 1, wherein the rising part of a scanning signal is detected as the point of change from a blank part to a printed part of the line pattern relative to each of said directions and the decaying part of a scanning signal is detected as the point of change from a printed part to a blank part.

3. A pattern recognizing system as claimed in claim 1, further comprising delay means interposed between said detector means and said slope discriminating means.

4. A pattern recognizing system as claimed in claim 1, wherein said detector means comprises a detector for detecting the rising and decaying parts of said scanning signals in one of said directions and a detector for detecting the rising and decaying parts of said scanning signals in the other of said directions.

5. A pattern recognizing system as claimed in claim 1, wherein said scanning field position detecting means comprises a field divider for forming a quadrilateral field.

6. A pattern recognizing system as claimed in claim 1, wherein the directions of scanning of said line pattern are horizontal and vertical.

7. A pattern recognizing system as claimed in claim 1, wherein said reading means comprises a plurality of photoresponsive elements and amplifying means connected to the outputs of said elements.

8. A method for determining a line pattern, comprising the steps of scanning a line pattern in mutually perpendicular coplanar directions and providing scanning signals in accordance with such scanning;

detecting the rising and decaying parts of the scanning signals and providing rising and decaying signals in accordance with such detecting;

classifying the rising and decaying signals into line detecting signals in accordance with the slopes of the lines of the line pattern;

detecting a field in which the line pattern exists within the field of the scanning signals and setting a plurality of observing fields within the field;

counting the line detecting signals classified by the slopes of lines within the observing fields and detecting various strokes; and discriminating the line pattern by the combination of the detected strokes.